United States Patent Office 3,772,244
Patented Nov. 13, 1973

3,772,244
BIS(ORGANOTIN) STABILIZERS FOR VINYL CHLORIDE POLYMERS
Anatole Wowk, Edison, N.J., assignor to M & T Chemicals Inc., Greenwich, Conn.
No Drawing. Continuation-in-part of abandoned application Ser. No. 43,231, June 3, 1970. This application Oct. 4, 1971, Ser. No. 186,430
Int. Cl. C08f 45/62
U.S. Cl. 260—45.75 K 9 Claims

ABSTRACT OF THE DISCLOSURE

This invention comprises novel compounds of the formula:

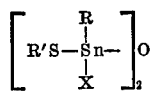

wherein R is a hydrocarbon radical, R' is a hydrocarbon radical, the residue of a carboxylic acid ester or the residue of an alcohol, and X is halogen, methods of preparing these novel compounds, and polymers stabilized by these novel compounds against the deteriorative effects of heat and light.

---

This invention relates to novel organotin compounds and to novel stabilized halogen-containing polymers compositions. This application is a continuation-in-part of U.S. patent application Ser. No. 43,231, filed June 3, 1970, and now abandoned.

Halogen-containing polymers, including homopolymers and copolymers of vinyl chloride and vinylidene chloride, are materials which have proven useful, because of their desirable physical properties. Uses of these materials have been limited, however, by their inherent instability when exposed to conditions of heat and light. Under such conditions, the halogen-containing polymer may discolor, become brittle, crack, check or otherwise suffer deterioration of its physical properties. Thus, unstabilized chlorine-containing polymer compositions would be highly unsatisfactory for outdoor use where they may be subjected to both heat and light. Various techniques are known for stabilizing these polymers against degradation in the presence of heat alone or light alone but no single stabilizer compound has been found which confers the high degree of both heat and light stability which is required for outdoor use.

A further defect of prior art stabilizers, is that they may normally be viscous liquids or pasty gels. They would thus be considerably more difficult to handle than solid stabilizers.

It is an object of this invention to provide novel organotin compounds which are characterized by their unexpectedly superior physical properties. It is a further object of this invention to provide novel chlorine-containing polymer compositions characterized by their high resistance to degradation during outdoor exposure.

One aspect of this invention comprises halogen-containing polymers stabilized against the deteriorative effect of heat and light comprising a halogen-containing polymer and a stabilizing amount of a compound of the formula

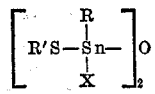

wherein R is a monovalent hydrocarbon radical, R' is a hydrocarbon radical, the residue of a carboxylic acid ester

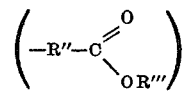

or the residue of an alcohol (—R"—OH) containing up to 20 carbon atoms, and X is halogen.

The novel compounds of this invention are prepared by reacting a compound of the formula RSn(OX)₂X wherein R is a hydrocarbon radical selected from the group consisting of alkyl, alkenyl, cycloalkyl, aralkyl, aryl, and alkaryl and X is halide with one or more mercaptans, mercapto alcohols, or mercapto acid esters.

The novel compounds of this invention thus include those of the formula

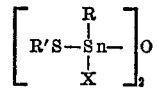

In these formulae R is a hydrocarbon radical selected from the group consisting of alkyl, cycloalkyl, aralkyl, alkaryl, and aryl. R' is a hydrocarbon radical selected from the same group as R, a residue of a carboxylic acid ester —R"COOR''' or a residue of an alcohol —R"—OH. R" is a divalent hydrocarbon radical containing up to 20 carbon atoms and R''' is selected from the same group as R.

More specifically, R is a hydrocarbon radical containing up to 20 carbon atoms and selected from the group consisting of alkyl, cycloalkyl, aralkyl, alkaryl, and aryl, and X is a halogen atom selected from the group consisting of chlorine, bromine, and iodine. When R is alkyl, it may be a straight chain alkyl or a branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes alkyls having less than about 20 carbon atoms. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g. may bear a non-reactive substituent such as alkyl, aryl, cycloalkyl, aralkyl, alkaryl, ether, etc.

Typical novel compounds of this invention include:
bis(monobutylmonochlorotin lauryl mercaptide) oxide,
bis(monobutylmonochlorotin octyl mercaptide) oxide,
bis(monobutylmonochlorotin benzyl mercaptide) oxide,
bis(monobutylmonochlorotin xylyl mercaptide) oxide,
bis(monobutylmonochlorotin cyclohexyl mercaptide) oxide,
bis(monobutylmonochlorotin phenyl mercaptide) oxide,
bis(monooctylmonochlorotin lauryl mercaptide) oxide,
bis(monooctylmonochlorotin octyl mercaptide) oxide,
bis(monooctylmonochlorotin benzyl mercaptide) oxide,
bis(monooctylmonochlorotin xylyl mercaptide) oxide,
bis(monooctylmonochlorotin cyclohexyl mercaptide) oxide,
bis(monocyclohexylmonochlorotin lauryl mercaptide) oxide,
bis(monomethylmonochlorotin lauryl mercaptide) oxide,
bis(monomethylmonochlorotin benzyl mercaptide) oxide,
bis(monomethylmonochlorotin cyclohexyl mercaptide) oxide,
bis(monomethylmonochlorotin xylyl dimercaptide) oxide,
bis(monobutylmonochloro-S-2-mercaptoethanol tin) oxide,
bis(monobutylmonochloro-S-3-mercaptopropanol tin)

bis(monobutylmonochlorotin isooctyl mercaptoacetate) oxide,
bis(monooctylmonochlorotin isooctyl mercaptoacetate) oxide,
bis(monocyclohexylmonochlorotin isooctyl mercaptoacetate) oxide,
bis(monomethylmonochlorotin isooctyl mercaptoacetate) oxide,
bis(monophenylmonochlorotin isooctyl mercaptoacetate) oxide,
bis(monobutylmonochlorotin lauryl mercaptoacetate) oxide,
bis(monobutylmonochlorotin benzyl mercaptoacetate) oxide,
bis(monobutylmonochlorotin isooctyl mercaptopropionate) oxide,
bis(monooctylmonochlorotin isooctyl mercaptopropionate) oxide,
bis(monocyclohexylmonochlorotin isooctyl mercaptopropionate) oxide,
bis(monomethylmonochlorotin isooctyl mercaptopropionate) oxide,
bis(monophenylmonochlorotin isooctyl mercaptopropionate) oxide,
bis(monobutylmonochlorotin lauryl mercaptopropionate) oxide,
bis(monobutylmonochlorotin benzyl mercaptopropionate) oxide,
bis(monobutylmonochlorotin isooctyl mercaptopropionate) oxide, and
bis(monobutylmonochlorotin dodecyl mercaptopropionate) oxide.

Compounds containing a bromide radical in place of chloride are also suitable, as are compounds wherein R' represents the residue of a carboxylic acid ester

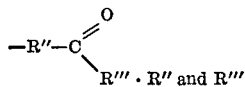

R''' · R'' and R''' may each contain up to 20 carbon atoms. The hydrocarbon radical R which is bonded to the tin atom may also contain up to 20 carbon atoms.

The mono - halo - mono organotin oxide reactant [RSnXO]$_n$ of this invention is prepared from the compound RSnX$_3$. Typical compounds RSnX$_3$ include the following: ethyltin trichloride, propyltin trichloride, n-butyltin trichloride, hexyltin trichloride, octyltin trichloride, phenyltin trichloride, o-tolyltin trichloride, benzyltin trichloride, butenyltin trichloride, ethynyltin trichloride, butyltin tribromide, and n-octyltin tribromide.

Compounds such as butyltin bromide dichloride may be employed. Preferably the compound RSnX$_3$ is a chloride; and the preferred compounds may be n-butyltin trichloride and n-octyltin trichloride. The process for preparing the compound RSn(OH)$_2$X includes maintaining an aqueous reaction mixture containing RSnX$_3$; adding to said reaction mixture a catalytic amount of a catalyst selected from the group consisting of aluminum chloride, titanium tetrachloride, bismuth trichloride, ferric chloride, cobalt chloride, nickel chloride, cadmium chloride, zirconium tetrachloride, boron trifluoride etherate, mercuric chloride, cupric chloride, trifluoracetic acid, and zinc fluoride; thereby forming a precipitate containing RSn(OH)$_2$X and recovering said precipitate from aqueous reaction mixture. In practice, 10–200 parts, say 17.5 parts of RSnX$_3$ are added to 100 parts of aqueous reaction medium, preferably water. Catalyst, preferably aluminum chloride, is added in an amount of 0.1–10 parts, say 0.95 part, and the solution allowed to stand for up to 2–3 hours. The solid precipitate which forms may be separated as by filtration and washed with 10–1000 parts, say 15 parts of water. After further washing with 6–60 parts, say 12 parts of e.g. acetone, the precipitate may be air-dried. The product, typically obtained in an amount of 2.5 parts, is recovered from the filtrate.

The process for preparing RSn(OH)$_2$X when R is alkyl includes maintaining an aqueous reaction mixture containing RSnX$_3$; heating said reaction mixture thereby forming a precipitate containing RSn(OH)$_2$X product; and recovering said precipitate from said aqueous reaction medium.

Typical reactants [RSnXO]$_n$ include the following: ethyltin chloride oxide polymer, propyltin chloride oxide polymer, n-butyltin chloride oxide polymer, iso-butyltin chloride oxide polymer, hexyltin chloride oxide polymer, octyltin chloride oxide polymer, phenyltin chloride oxide polymer, o-tolyltin chloride oxide polymer, benzyltin chloride oxide polymer, butenyltin chloride oxide polymer, and ethynyltin chloride oxide polymer; ethyltin chloride dihyrdoxide, propyltin chloride dihdyroxide, n-butyltin chloride dihydroxide, iso-butyltin chloride dihydroxide, hexyltin chloride dihydroxide, octyltin chloride dihydroxide, phenyltin chloride dihydroxide, o-tolyltin chloride dihydroxide, benzyltin chloride dihdyroxide, butenyltin chloride dihydroxide and ethynyltin chloride dihdyroxide. Alternatively, the chloride radical may be replaced by bromide.

Two reaction mechanisms for the formation of the novel compounds of this invention are clearly illustrated by the following equations:

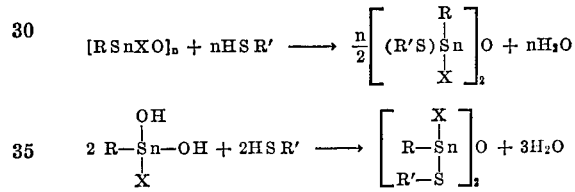

These equations graphically show that a reaction occurs between the mercapto radical and the compound RSn(OH)$_2$X whereby water splits off and a chemical bond is formed between the tin and sulfur.

It is within the scope of this invention that pure, impure or commercial grades of the reactants may be employed satisfactorily. In general, pure compounds of the above formulae may be prepared from pure raw materials. However, these novel compounds may be diluted with innocuous, inert materials thereby permitting the use of technical grades of materials or intermediates in their preparation.

Any suitable reaction temperature may be employed. It is ordinarily preferred to use room or slightly elevated temperatures of the order up to about 100° C. The exothermic nature of the reaction between the compound RSn(OH)$_2$X and the sulfur containing compounds affords a considerable saving in the expenditure of external heat. The presence of water produced by the condensation reaction usually requires an additional heating or refluxing in order to strip said water from the reaction product, though it may be removed in any suitable manner.

The use of inert organic solvents as a medium for a reaction such as toluene, benzene, methyl alcohol, etc. is contemplated. The presence of such solvent facilitates the desired reaction. The solvent may be eliminated from the reaction product at the completion of the reaction by any suitable means.

This may be accomplished by vaporizing the solvent under vacuum at elevated temperatures. Pressures of about 2 to 30 mm. of mercury at temperatures of 75° C. to 160° C. are satisfactory in affecting the removal of toluene or like solvent from the reaction product.

By these procedures, the novel compounds of this invention can be obtained in almost theoretical yields. These yields are indicative that it is not necessary to use an excess of either reactant, the total amount of starting materials being substantially utilized in the formation of the final reaction product.

Polymers or resins which may be stabilized by practice of this invention are halogen-containing organic polymers, typically those which contain chlorine atoms bonded to the polymer chain. These polymers inclde polyvinyl chloride-type polymers, e.g. polyvinyl chloride, polyvinylidene chloride, etc. They may also include copolymers formed by the copolymerization of vinyl chloride or vinylidene chloride with each other or with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc.

The polymers may be either "rigid" or "flexible." When "rigid" polymers are employed, they may include impact modifiers, pigments and/or fillers, lubricants, etc., in addition to the resin and stabilizer. When "flexible" polymers are employed, they may include plasticizer (primary and secondary), pigments and/or fillers, lubricants, etc., in addition to the resin and stabilizer.

In general the synthetic resins which can be stabilized according to this invention include the following polymers which may or may not be mixed with other stabilizers, additives, flameproofing agents, dyes, pigments, etc.:

(a) Homopolymer of vinyl chloride,
(b) Homopolymer of vinylidene chloride,
(c) Copolymers of vinyl chloride and acrylonitrile,
(d) Copolymers of vinylidene chloride and acrylonitrile,
(e) Copolymers of vinylidene chloride, acrylonitrile and N-isopropylacrylamide,
(f) Copolymers of vinyl chloride and vinyl acetate,
(g) Copolymers of vinyl chloride, acrylonitrile, and N-butyrylacrylamide,
(h) Copolymers of vinyl chloride, methyl methacrylate and vinyl acetate,
(i) Copolymers of vinyl chloride or vinylidene chloride with acrylonitrile and N-vinylpyridine,
(j) Copolymers of vinyl chloride or vinylidene chloride with acrylonitrile mixed with a homopolymer of an N-alkylacrylamide (e.g. N-isopropylacrylamide, N-octylacrylamide, etc.),
(k) Copolymers of vinyl chloride or vinylidene chloride with acrylonitrile mixed with a homopolymer or copolymer of α-vinylpyrrolidone,
(l) Copolymers of vinyl chloride or vinylidene copolymers of an N-alkylacrylamide and acrylonitrile,
(m) Other copolymers and mixtures of homopolymers or copolymers of vinyl chloride and/or vinylidene chloride with or without other monoolefinically unsaturated polymerizable monomers containing from 2 to 20 or more carbon atoms, especially those containing from 2 to 8 carbon atoms and no more than one nitrogen atom and no more than 2 oxygen atoms.

The methods for preparing the synthetic resins described above are well known and such methods and a great variety of such synthetic resins are described in the prior art. These synthetic resins are useful in preparing fibers, films, molding compositions, coating materials, wrapping materials, electrical insulation, fabrics, rope, plastic, pipe, paints, laminating materials for safety glass, adhesives, etc. Synthetic resins as stabilized in accordance with this invention are especially advantageous in synthetic fibers and products made therefrom such as rugs, wearing apparel, draperies, seat covers, upholstery, rope, cigarette filters, etc. Resistance to weathering (e.g. moisture and ultraviolet light) is especially important for items exposed to out-of-doors conditions. Resistance to ultraviolet light is also important for rugs, draperies, automobile seat covers, porch furniture, upholstery and the like which may receive considerable sunlight.

The following examples are for illustration and are not to be construed as limiting the scope of the invention.

EXAMPLE 1

Preparation of bis(monobutylmonochlorotin isooctyl mercaptopropionate) oxide

Bis(monobutylmonochlorotin isooctyl mercaptopropionate) oxide was prepared by adding 22.7 grams (0.10 mole) of butylchlorotin oxide polymer and 21.8 grams (0.10 mole) of isooctyl mercaptopropionate to 150 milliliters of benzene contained in a reaction vessel equipped with a stirrer, a thermometer and a reflux condenser above a Dean-Stark water trap. The water was azetotroped out at 80° C. to 82.5° C. The benzene solvent was stripped leaving the product. The product exhibited a weight of 44.5 grams. Analysis of the product indicated the following:

Elemental percentage of: Calculated (percent): Sn, 27.20; S, 7.34. Found (percent): Sn, 26.99; S, 7.36.

EXAMPLE 2

Preparation of bis(monobutylmonochloro-S-2-mercaptoethanol tin) oxide.

Bis(monobutylmonochloro-S-2 - mercaptoethanol tin) oxide was prepared by adding 18.4 grams (0.075 mole) of butylchlorotin dihydroxide and 5.9 grams (0.075 mole) of 2-mercaptoethanol to 120 milliliters of benzene in a 200 milliliter reaction flask equipped with a stirrer, a thermometer, and a reflux condenser. The foregoing procedure was followed. The resulting yellow liquid product exhibited a weight of 21.7 grams and was analyzed as containing the following:

Elemental percentage of: Calculated (percent): Sn, 40.02; S, 10.81; Cl, 11.95. Found (percent): Sn, 40.97; Sr, 10.03; Cl, 11.34.

This invention also concerns a novel composition for stabilizing a vinyl chloride homopolymer or copolymer against the deteriorative effects of heat which comprises as a first stabilizer a novel compound of this invention exhibiting a compound of the formula

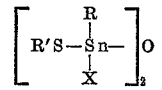

wherein R, R', and X are defined hereinbefore and as a second stabilizer an organotin compound of the formula $R_2{}^1Sn(SR^2)_2$. In the formula $R^2$ is a hydrocarbon radical containing up to 20 carbon atoms and selected from the group consisting of alkyl, cycloalkyl, aralkyl, alkaryl, and aryl. $R^2$ is selected from the same group as $R^1$ or it may be a residue of a carboxylic acid ester —$R^3COOR^4$. In these formulae $R^3$ is a divalent hydrocarbon radical containing up to 20 carbon atoms and $R^4$ is selected from the same group as $R^1$. Examples of suitable second stabilizers are dioctyltin bis(isooctyl mercaptoacetate) and dibutyltin bis(lauryl mercaptide).

Preferred second stabilizers include:

dibutyltin bis(lauryl mercaptide)
dibutyltin bis(octyl mercaptide)
dibutyltin bis(benzyl mercaptide)
dibutyltin bis(xylyl mercaptide)
dibutyltin bis(cyclohexyl mercaptide)
dibutyltin bis(phenyl mercaptide)
dioctyltin bis(lauryl mercaptide)
dioctyltin bis(octyl mercaptide)
dioctyltin bis(benzyl mercaptide)
dioctyltin bis(xylyl mercaptide)
dioctyltin bis(cyclohexyl mercaptide)
dicyclohexyltin bis(lauryl mercaptide)
dimethyltin bis(lauryl mercaptide)
dimethyltin bis(benzyl mercaptide)
dimethyltin bis(cyclohexyl mercaptide)

dimethyltin bis(xylyl dimercaptide)
dibutyltin bis(isooctyl mercaptoacetate)
dioctyltin bis(isooctyl mercaptoacetate)
dicyclohexyltin bis(isooctyl mercaptoacetate)
dimethyltin bis(isooctyl mercaptoacetate)
diphenyltin bis(isooctyl mercaptoacetate)
dibutyltin bis(lauryl mercaptoacetate)
dibutyltin bis(benzyl mercaptoacetate)

Other preferred second stabilizers include:

dibutyltin bis(cyclohexyl maleate),
dioctyltin bis(cyclohexyl maleate),
dibutyltin bis(2-methylcyclohexyl maleate),
diamyltin bis(4-ethylcyclohexyl maleate),
dibutyltin bis(4-methylcyclohexyl maleate),
dibutyltin bis(2-cyclohexylcyclohexyl maleate),
dibutyltin bis(4-cyclohexylcyclohexyl maleate),
dihexyltin bis(4-cyclohexylcyclohexyl maleate),
dibutyltin bis(2-ethynylcyclohexyl maleate),
dibutyltin bis(4-hydroxymethylcyclohexyl maleate),
dibutyltin bis(2,6-dimethylcyclohexyl maleate),
dibutyltin bis(2,4,6-trimethylcyclohexyl maleate),
dibutyltin bis(4-sec-butylcyclohexyl maleate),
dioctyltin bis(4-tert-butylcyclohexyl maleate), etc.

The most preferred second stabilizer is dibutyltin bis(isooctyl mercaptoacetate).

The first and second stabilizers may be present in stabilizing amounts. Typically the first stabilizer is used in an amount of 0.05 to 10 parts by weight of 100 parts by weight of halogen-containing, typically vinyl chloride resin. Preferably, it may be used in the amount of 0.25-2 parts, preferably 0.3 part per 100 parts of halogen-containing resin.

Typically the second stabilizer is present in an amount of 0.1-10 parts per 100 parts by weight of halogen-containing resin. Preferably the amount used may be 1, say 2 parts per 100 parts of halogen-containing resin. Preferably the second stabilizer is present in an amount about five times the amount of the first stabilizer. Preferred results are achieved when the second stabilizer is present in an amount of at least about twice that of the first stabilizer.

Thus a preferred heat-stable vinyl chloride polymer composition of this invention comprises 100 parts by weight of a vinyl chloride polymer; a stabilizing amount, typically 0.05–10 parts of a first stabliizer having at least one direct halogen to tin bond and at least one carbon to tin bond wherein R is selected from the group consisting of alkyl having 1–20 carbon atoms, aryl, alkaryl, aralkyl, and cyclo-alkyl; and a second stabilizer $$R_2^1 Sn(SR^2)_2$$

wherein $R^1$ is a hydrocarbon radical selected from the group consisting of alkyl, cycloalkyl, aralkyl, alkaryl, and aryl, and $R^2$ is a residue of a carboxylic acid ester or a radical selected from the same group as $R^1$.

The novel heat and light stable compositions of this invention may be formulated by such techniques as milling, dry blending, Banbury blending, or any other commonly employed formulating techniques.

On the formulating methods which is particularly convenient is the formation of a stabilizer composition containing the first stabilizer and the second stabilizer. This stabilizer composition is later added to, and thoroughly mixed with, the vinyl chloride polymer. Where this technique is employed, the stabilizer composition typically comprises stabilizing amounts of the stabilizers, typically 0.05 to 5 parts by weight of the first stabilizer and 0.1 to 10 parts by weight of the second stabilizer. Preferably, it comprises about 0.05 to 2, say 0.3 part of the first stabilizer and about 0.5–4, say 0.2 part of the second stabilizer. Preferably the second stabilizer may be present in an amount greater than the amount of the first stabilizer.

Whatever formulating technique be employed, it will be desirable to substantially complete and uniformly disperse the first stabilizer and the second stabilizer throughout the vinyl chloride polymer composition.

It is a feature of the novel stabilizer systems of this invention that it permits attainment of stabilized halogen-containing polymers and resins, particularly vinyl halide polymers such as vinyl chloride characterized by their resistance to the deteriorative effect of heat. The degree of stabilization attained in such systems may be considerably in excess of that previously attainable by any prior art stabilizer system.

Because of the outstanding properties of this novel stabilizer system, it is possible to effect stabilization with lower quantities and thereby to obtain a more effective system on a cost-performance basis.

In order to set forth clearly the novel features of this invention and to illustrate the unexpected and outstanding results which may be attained by practice of this invention, the following illustrative examples may be set forth wherein all parts are parts by weight unless otherwise indicated.

In these examples, the rigid vinyl chloride polymer employed was that having a specific gravity of 1.40, a Shore Durometer 'D' hardness of 80 and an ultimate tensile strength of about 7,000 p.s.i. sold under the trademark "Geon 103 EP."

EXAMPLE 3

Testing of bis(monobutylmonochloro-S-2-mercaptoethanol tin) oxide

The preferred illustrative first stabilizer employed was bis(monobutylmonochloro-S-2-mercaptoethanol tin) oxide. The second stabilizer used was dibutyltin bis(isooctyl mercaptoacetate). 100 parts of the vinyl chloride polymer was tested with addition of the stabilizer combination of the following amounts:

| | Parts |
|---|---|
| Vinyl chloride polymer | 100 |
| First stabilizer | 0.2 |
| dibutyltin bis(isooctylmercaptoacetate) | 1.8 |

The foregoing composition was thoroughly blended by placing the polyvinyl chloride on a two-roller differential mill which was oil-heated to a temperature of 175° C. together with the noted quantity of first and second stabilizers, and the mixture was milled for about 5 minutes. A continuous band of the composition formed around one of the rollers. This band was cut and the composition was removed from the hot roller as a continuous sheet. Squares of this material measuring 2.54 cm. x 2.54 cm. were cut for heat stability testing.

For the heat stability test, the squares were placed in an air oven regulated to maintain a temperature of 190° C. Samples of each composition were removed from the oven at 15-minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color The length of time in minutes required to reach a value of 3 or less was recorded as the Heat Stability Value.

EXAMPLE 4

(Control)

In control Example 4 the dibutyltin bis(isooctyl mercaptoacetate) was added in amount of 2 parts and no other stabilizer was present.

The results of the heat stability tests are as follows:

| Example | Heat stability value in minutes | Color after milling |
|---|---|---|
| 3 | 75 | 7 |
| 4 | 60 | 7 |

It will be apparent from an inspection of Examples 3 and 4 that the Heat Stability Value (H.S.V.) of the novel product of this invention is outstanding. Furthermore, the Color After Milling of the novel product is 7, which (when considered together with the 75-minute H.S.V.) is outstandingly superior. Accordingly, it will be apparent to those skilled in the art that practice of the novel process of this invention permits attainment of polymeric resins characterized by extremely high degree of heat stability.

Although this invention has been illustrated by reference to specific examples, changes therein which clearly fall within the scope of the invention will be apparent to those skilled in the art. It is, therefore, to be limited solely by the scope of the appended claims.

What is claimed is:

1. A novel halogen-containing polymer composition stabilized against the deteriorative effect of heat, said composition comprising:
   (1) A polymer selected from the group consisting of polyvinyl chloride, polyvinylidene chloride and copolymers of vinyl chloride or vinylidene chloride with at least one ethylenically unsaturated monomer, and
   (2) A stabilizing amount of a substantially pure compound exhibiting the formula

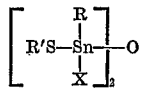

wherein R is a monovalent hydrocarbon radical containing up to 20 carbon atoms, R' is a radical selected from the group consisting of a hydrocarbon radical selected from the same group as R,

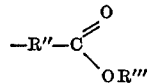

or —R"—OH wherein R''' is selected from the same group as R, R" is a divalent hydrocarbon radical containing up to 20 carbon atoms and X is a halogen selected from the group consisting of bromine and chlorine.

2. The novel halogen-containing polymer composition of claim 1 wherein R is alkyl.
3. The novel halogen-containing polymer composition of claim 1 wherein R is butyl.
4. The novel halogen-containing polymer composition of claim 1 wherein R is octyl.
5. The novel halogen-containing polymer composition of claim 1 wherein X is chlorine.
6. The novel halogen-containing polymer of claim 1 wherein said stabilizing compound is of the formula:

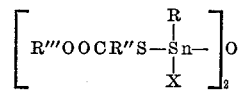

wherein R and R''' are hydrocarbons selected from the group consisting of alkyl having 1 to 20 carbon atoms, aryl, cycloalkyl, aralkyl, and alkaryl and R" is a divalent hydrocarbon radical containing up to 20 carbon atoms.

7. The novel halogen-containing polymer of claim 1 wherein said stabilizing compound R and R''' are alkyl of from 1 to 20 carbon atoms.
8. The novel halogen-containing polymer of claim 1 wherein said stabilizing compound is bis(monobutylmonochloro-S-3-mercaptopropanol tin) oxide.
9. The novel halogen-containing polymer of claim 1 wherein said stabilizing compound is bis(monobutylmonochloro-S-2 mercaptoethanol tin) oxide.

References Cited
UNITED STATES PATENTS

| | | | |
|---|---|---|---|
| 2,809,956 | 10/1957 | Mack et al. | 260—45.75 |
| 3,542,825 | 11/1970 | Hoye | 260—45.75 |
| 3,565,931 | 2/1971 | Brecker | 260—45.75 |

DONALD E. CZAJA, Primary Examiner

V. P. HOKE, Assistant Examiner

UNITED STATES PATENT OFFICE
CERTIFICATE OF CORRECTION

Patent No. 3,772,244　　　　　　　　Dated November 13, 1973

Inventor(s) ANATOLE WOWK

It is certified that error appears in the above-identified patent and that said Letters Patent are hereby corrected as shown below:

Column 2, line 10 - Change formula $RSn(OX)_2X$ to read $$--RSn(OH)_2X--$$

Signed and sealed this 2nd day of April 1974.

(SEAL)
Attest:

EDWARD M. FLETCHER, JR.　　　　　　　C. MARSHALL DANN
Attesting Officer　　　　　　　　　　　Commissioner of Patents